Jan. 19, 1965   C. E. STEDMAN, JR   3,166,018
FLUID PUMP BODY AND GEAR SET
Filed Nov. 8, 1963   5 Sheets-Sheet 1
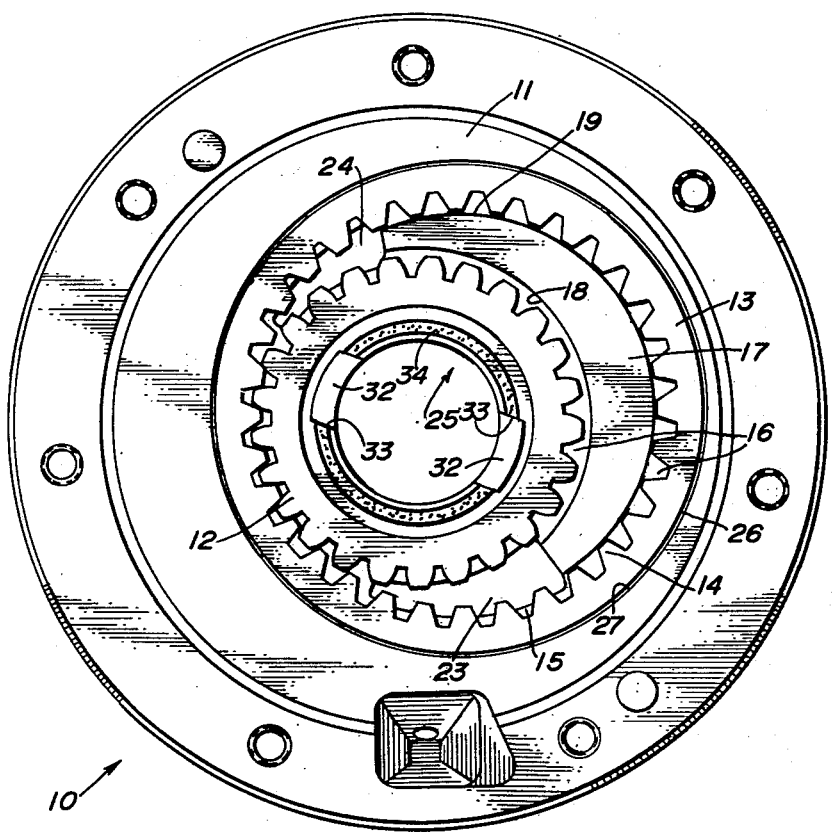
THE PRIOR ART
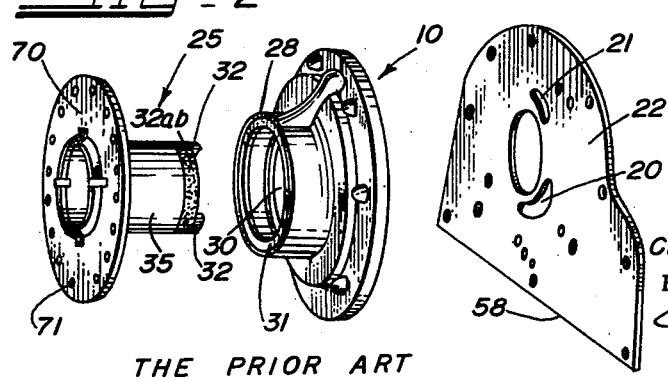
THE PRIOR ART
INVENTOR.
CRESSWELL E. STEDMAN, JR.
BY Jan. 19, 1965     C. E. STEDMAN, JR     3,166,018
FLUID PUMP BODY AND GEAR SET
Filed Nov. 8, 1963     5 Sheets-Sheet 2
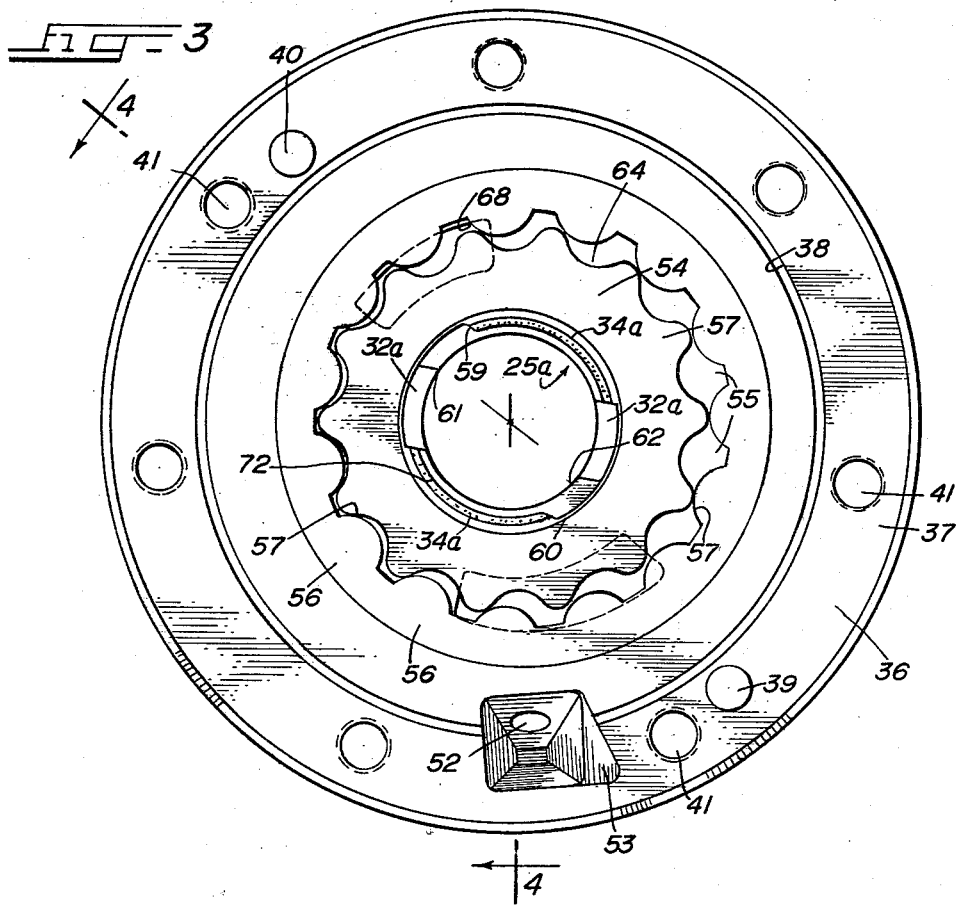
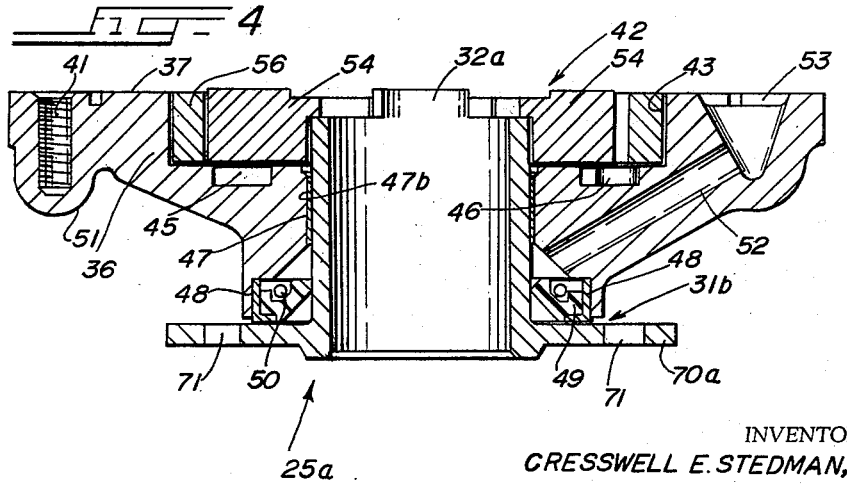
INVENTOR.
CRESSWELL E. STEDMAN, JR.
BY Charles B. Cannon
ATTY.

Jan. 19, 1965 C. E. STEDMAN, JR 3,166,018
FLUID PUMP BODY AND GEAR SET
Filed Nov. 8, 1963 5 Sheets-Sheet 3
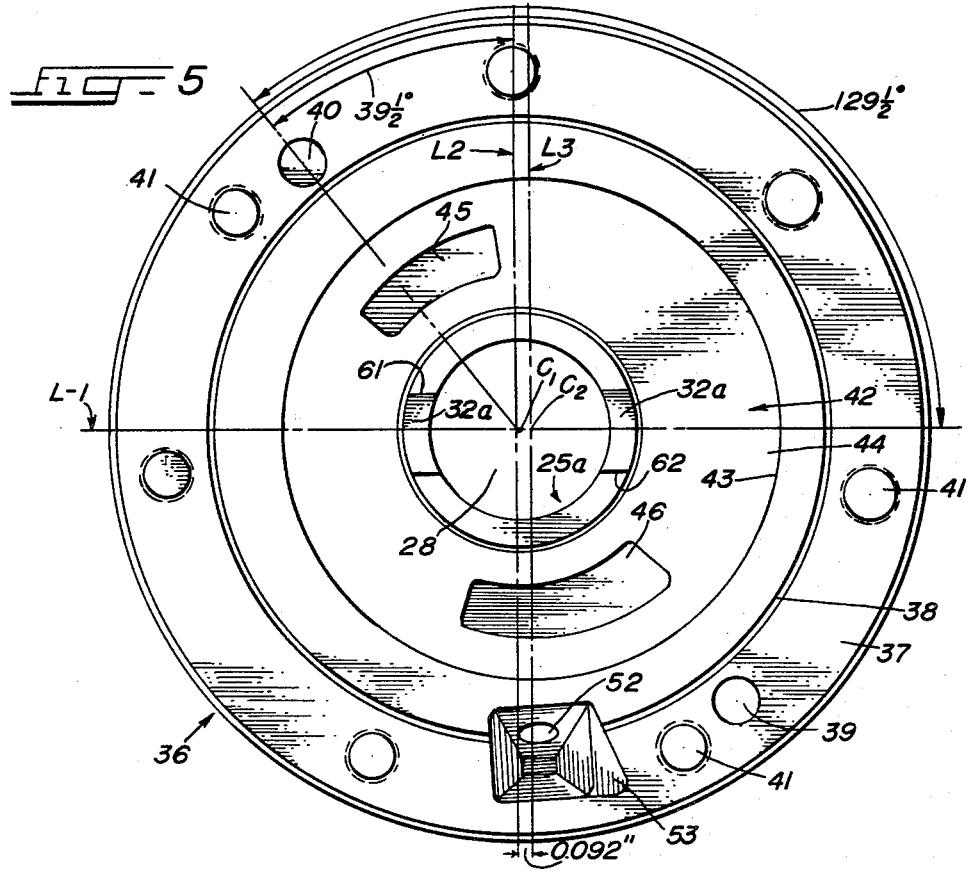
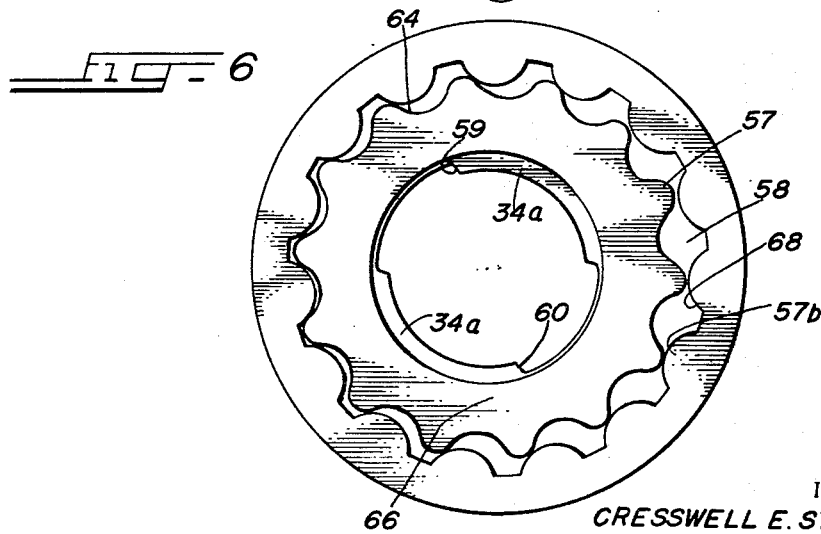
INVENTOR.
CRESSWELL E. STEDMAN, JR.

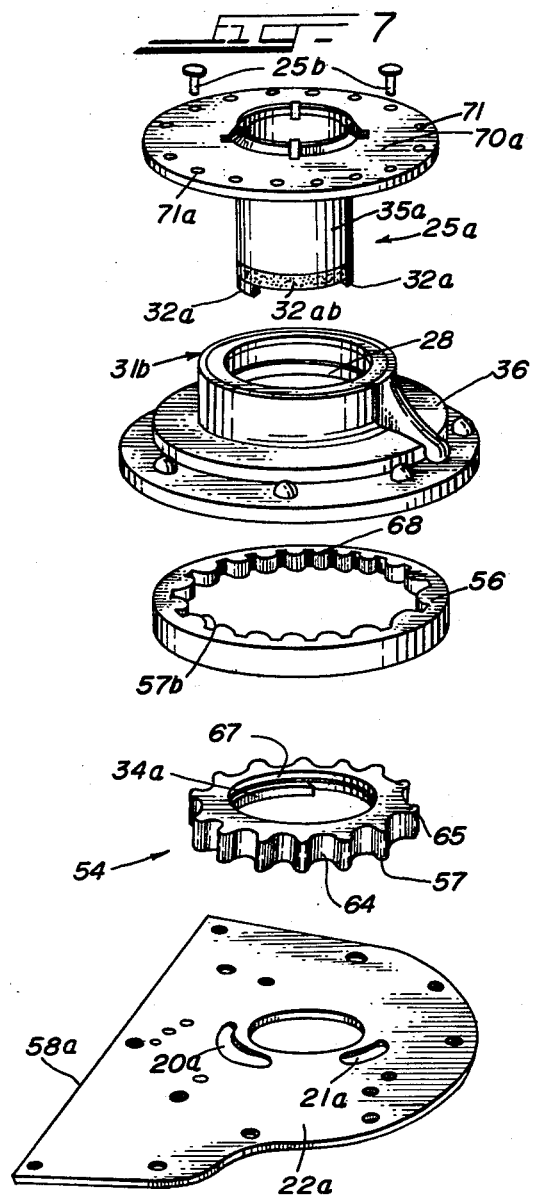

Jan. 19, 1965 C. E. STEDMAN, JR 3,166,018
FLUID PUMP BODY AND GEAR SET
Filed Nov. 8, 1963 5 Sheets-Sheet 5
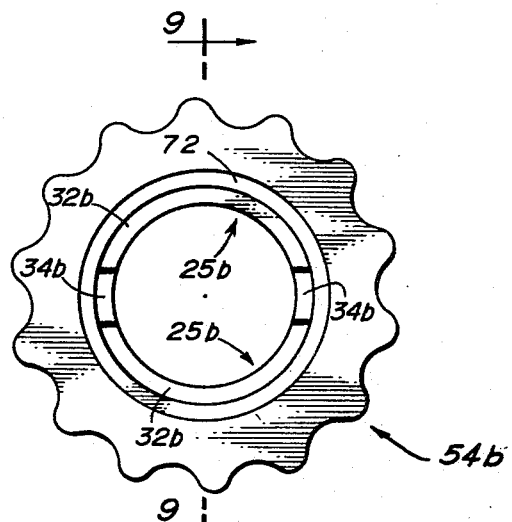
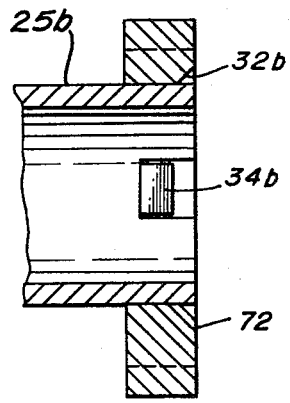
INVENTOR.
CRESSWELL E. STEDMAN, JR.
BY
Charles D. Cannon
ATTY.

United States Patent Office 3,166,018
Patented Jan. 19, 1965

3,166,018
FLUID PUMP BODY AND GEAR SET
Cresswell E. Stedman, Jr., 7840 SW. 21st St., Miami, Fla.
Filed Nov. 8, 1963, Ser. No. 322,489
4 Claims. (Cl. 103—126)

This invention relates to fluid pumps, particularly oil pumps of the gear type, for use in applications requiring oil or like pump driving fluid to be supplied under substantially constant, moderately high pressure, to perform a plurality of function in an automobile automatic transmission.

This invention relates more particularly to a novel pump body and gear or rotor set for use therein, of the conjugate, internal-external gear or rotor type for use in an automobile automatic transmission, particularly of the Buick Dynaflow automatic transmission type, namely, a transmission including a torque converter, where oil under pressure is supplied to the torque converter mechanism, and to a plurality of valves and the like, whereby power may be transmitted therethrough to the driving wheels of the vehicle. In transmissions of this type, moderately high oil pressure is needed for actual operation of the unit, including power transmission therethrough, and not merely for lubrication purposes. Therefore, as it well known in the art, the proper operation of the automobile depends importantly on the operation of the oil pump or pumps in such transmission units.

A common shortcoming of gears and pump sets of the prior art, particularly those used with and driven by the torque converters in transmissions of the Buick Dynaflow types, namely, the pump unit referred to as the front oil pump, has been that the internal-external gear sets and the pump housing are relatively short lived for reasons which will be explained more fully hereinafter. As a result of such relatively common failings of these parts, there exists a substantial replacement parts industry which supplies the demand for replacement parts of a type which are designed to overcome this common problem. However, as in many other industries, a common problem in the trade has been to obtain replacement sets which are uncomplicated, effective, and, most importantly, simple and inexpensive, so that replacement of worn-out parts is a relatively simple, practical and inexpensive matter for persons owning automobiles of this type who do not wish to incur the expense involved in the installation of a completely new transmission, or major parts thereof.

The problems with existing Buick Dynaflow gear sets and the pump covers therefor are known in the art, and attempts have been made to correct them by various replacements and/or modifications of existing parts and components. Other difficulties of such prior art pumps will be referred to in detail hereinafter.

Accordingly, it is an object of the present invention to provide a new and improved pump assembly for an automatic transmission of the Buick Dynaflow type, namely, the front oil pump which is driven by the torque converter.

It is a further object of the invention to provide a pump body having novel and critical dimensions and particularly in relation to the location of the principal recess, bore or gear pocket therein, and the relation thereof to the pump body and its relation to the driving hub which operates the pump gear set.

It is a further object of the present invention to provide a replacement gear set for the gear set presently used in such oil pumps, the replacement set being an internal-external gear set of the substantially continuous contact (other than clearance space) type, rather than the type presently used, which requires a fixed, crescent-shaped dam to be used therein.

It is a further object of the present invention to provide a new and improved pump assembly which is easily and simply replaceable without resort to replacement of expensive complementary parts and in which there is no requirement for precise or custom machine work and the like to be performed at the repair site.

It is a further object of the present invention to provide a novel pump body, and a gear set for use therein, which is replaceable and which may be satisfactorily placed in operative engagement with a pump drive mechanism, even when such pump drive mechanism or hub is so worn that it would otherwise require expensive and time-consuming replacement procedures.

An additional object of the present invention is to provide a new and improved pump assembly of the type referred to which has all of the above-named and other advantages and which also provides substantially the same or improved performance relative to the original equipment, as well as a greater life expectancy than original equipment pumps when used in normal service.

These and other objects and advantages of the present invention, including those inherent therein, will be more apparent when considered in conjunction with the following description of the preferred embodiments of the invention which are illustrated in the drawings in which:

FIG. 1 is a rear elevational view of a pump assembly of the prior art;

FIG. 2 is an exploded view of the assembly of the prior art showing the pump hub, the pump body and gear set assembly, and pump cover plate units of the prior art;

FIG. 3 is a rear elevational view of the pump assembly of the present invention in its normal position of use;

FIG. 4 is a sectional view on line 4—4 in FIG. 3;

FIG. 5 is a rear elevational view of the pump body including the hub but not the gear set;

FIG. 6 is a rear elevational view of the rotor gear set of the present invention in position of use;

FIG. 7 is an exploded isometric view of the driving hub, pump assembly and pump cover plate of the present invention;

FIG. 8 is a rear elevational view o fthe inner rotor gear and a portion of the driving hub of a modification of the present invention; and FIG. 9 is a vertical sectional view of the gear and hub of FIG. 8 taken along lines 9—9 thereof.

In the drawings, FIG. 1 shows the pump assembly of the prior art; FIG. 2 shows an exploded view of the driving hub pump, and cover plate assembly of the prior art, and FIGS. 3 to 7, inclusive, show various aspects and details of the pump unit of the present invention. In order to understanding the present invention, it is deemed necessary to have a understanding of a typical pump, hub and and cover plate assembly of the prior art, as shown in FIGS. 1 and 2, and to compare the prior art pump assembly shown in FIGS. 1 and 2 with the novel pump assembly of the present invention, as shown in FIGS. 3 to 7, inclusive, of the drawings.

In referring to the present invention, and to the prior art devices of a similar nature, it will be appreciated that a complete and operative pump assembly comprises not only a pump body and gear set proper, but also a front driving hub portion to turn the gear set, and a flat cover plate portion to cover the rear of the pump body. Thus, many automatic transmissions have gear pumps of this type, which include the driving hub which supports and turns the inner gear, and a pump body including a pocket which supports the outer gear, and wherein the placement of the pump body in the desired orientation is facilitated by the provision of locating dowels which engage corresponding cutouts on the pump cover plate. Pumps of this sort are well known in the art, and are illustrated, for example, in United States Patent No. 3,013,848, issued December 19, 1961, to Earl M. Terry. This patent shows a certain portion of the automatic transmission type with which the present pump is used, and a further reference cited therein is equally applicable to the gear pump of the present invention, namely, the booklet entitled "Buick Products School Manual," copyrighted in 1954 by Buick Motors Division of General Motors Corporation.

In addition, gear pumps of the type referred to herein are illustrated in United States Patent No. 3,117,527, issued January 14, 1964, to W. A. Messmer. Patent No. 3,118,425 issued November 14, 1961, to G. H. Chambers, also illustrates pumps of the type referred to herein, and shows the location and orientation of the parts thereof in the entire automatic transmission and the automobile itself. It is throught that the foregoing references will enable those skilled in the art to practice the present invention. For brevity herein, however, such units are sometimes referred to herein as Buick "Dynaflow" type automatic transmissions, inasmuch as those skilled in the art are extremely familiar with the construction of such assemblies regardless of the exact manner of reference thereto.

The present invention relates to the pump body and to the gear set which is received therein, but the same pump hub and cover plate may be used with both the new pump unit and the old unit. Therefore, when reference is made herein to the pump hub, certain parts of the new pump, and the cover plate and various portions of these units, in the environment of the unit of the prior art, certain reference numbers will be used, and when reference is made to the corresponding parts, namely, the pump hub, the pump body and gear set, and the cover plate, and portions of these units, in the environment of the new pump units, a number corresponding to the reference numeral of that part in the prior art will be used but will be distinguished therefrom by appending the letter "a" to the new unit or to the old unit in the new environment.

A pump body and gear set unit of the prior art are generally indicated at 10 in FIGS. 1 and 2, and they include a pump body 11, a spur-type externally-toothed pinion gear 12, meshingly engaged with a spur-type internally-toothed ring gear 13, and each of said gears 12, 13 embodies a plurality of tooth-like projections such as 14, and grooves, such as 15, therebetween.

Thus, the front pump assembly 10, shown in FIGS. 1 and 2, is covered in operation by a cover plate 22 (FIG. 2) having inlet and outlet orifices 20 and 21, respectively, therein, and a flat edge portion 58.

The gears 12 and 13 are 25-tooth and 32-tooth involute spur gears, respectively, and as these gears 12, 13 are operated in meshing relationship, it can been that rotation thereof through a cycle will result in the continuous formation, expansion and contraction of a plurality of chambers 16 into which the driving fluid is introduced, carried, and subsequently expelled under pressure. During a part of the cycle on which the teeth 14 are not engaging each other to form such chambers 16, pockets of driving fluid are formed by the engagement of the gear teeth projections 14 with a fixed dam 17 of a generally truncated crescent-shaped configuration, sometimes hereinafter called a "crescent" 17, which is fixedly attached to the pump body 11. These chambers 16 along the respective inner and outer surfaces 18 and 19 of the crescent 17 serve to transport the driving fluid from a region of expansion in chamber volume and pickup on the inlet side 20 of the cover plate 22 (FIG. 2), to a region of compression and high pressure on the exit outlet or exhaust side 21 of the cover plate 22. The driving fluid passes through the inlet and outlet orifices 20, 21 in the cover plate 22 (FIG. 2) during the chamber expansion and contraction phases of the cycle, and recesses 23 and 24 in the pump body 11 are provided to minimize leakage and/or cavitation in the region of rapid expansion and contraction under the high speed conditions of rotation (up to 5000 r.p.m.) encountered in normal operation.

It will thus readily be appreciated that in the prior art pump assembly 10 the inner or pinion and driving gear 12 is located off center from the ring or outer gear 13 a distance suitable for providing meshing engagement at one point in the cycle, and that the hub 25 (FIG. 2) which together with extension in the form of driving ears 32 thereon, and front flange 70, forms part of the driving means, is concentrically mounted with respect to the pinion gear 12. The outer surface 26 of the gear 13 defines a rotor pocket 27, which is concentric with the ring or outer gear or rotor 13, whereas, the hub-accommodating recess or counterbore 28 (FIG. 2) which accommodates therein a bushing 30 and a metal and rubber seal 31, is substantially concentric with the drive means in the form of the hub 25 (FIG. 2).

In the use of the pump assembly of the prior art, driving is accomplished by means of driving ears 32 which are formed on the cylindrical shaft portion 35 of the hub 25 and are adapted to engage corresponding recesses 33 situated between the driving lugs 34 (FIG. 1) of the pinion gear 12. It will thus be appreciated that when the ears 32 and the cylindrical shaft 35, of which they are an extension, and especially that part of the shaft marked 32ab and shown stippled in FIGS. 2 and 7, become worn, the gear may rock back and forth because the counterbore in the pinion gear 12 fits loosely over the portion 32ab of the shaft 35. Therefore, the pinion gear 12 which is engageable with the hub shaft 35 is displaceable to a position away from its intended axis to rotation. It will also further be understood that when the gear 12 moves from its centerline more than an amount equal to an ordinary operating clearance, it abrades the crescent 17, causing excessive clearance between the gear 12 and the crescent 17 and this results in lower oil pressure. Furthermore, a loose condition also results in wearing down of our cutting out of the cover plate 22 because of the influence of gravitation, general imbalance, gyroscopic forces, and the like, especially where the oil pressure is acting against the gear 12 in an off center position, and shaft wear permits deviation from a horizontal axis or position and allows a wobbling motion on the hub 25.

The foregoing and other difficulties experienced in the use of pumps of the prior art have created the need for a novel pump which will satisfy these shortcomings. The problem of excess wear on the plate 22, for example, has been acknowledged by the production and use of a special hardened and laminated plate to reduce cutting and wearing of the plate 22 by gear 12 (FIG. 1). However, measures such as those previously known in the art, including the provision of a hardened plate, have only corrected a part of the problem and are considered by those skilled in the art to be more or less stopgap measures which may temporarily alleviate the condition but which do not remedy the difficulty because they do not do away with the cause of such pump failures.

A further need which the present invention satisfies is that of providing a pump body, such as that shown at 36 in FIGS. 3, 4 and 5, and a gear set 54, 56 which is adaptable for use with a worn hub 25a. This driving hub 25a (FIG. 7) of an automatic transmission of the type to which the present invention relates, is not only comparatively expensive, but is normally attached in use by some 16 rivets 25b through holes 71 in the front flange 70 of the hub 25a to means driven by the car engine (not shown) and hence is extremely inaccessible for purposes of replacement, etc. In some units, in fact, this so-called "primary pump hub" 25a is integrally attached by welding to the front flange 70, and it is desired to avoid replacing these expensive parts if at all possible.

Therefore, to overcome the above-stated difficulties and to achieve the objects of the invention, and other objects and advantages inherent therein, the present invention contemplates providing a novel pump body 36, shown generally in FIG. 3, which comprises a flat rear mating surface 37 which is adapted to engage a cover plate 22a; a sealing groove 38; a plurality of countersunk, tapped, cap screw or bolt-receiving holes 41; upper and lower locating dowels 39, 40 as shown in FIGS. 3 and 5; a cut-out bore or pocket 42 (FIG. 5), formed of a wall portion 43 and a flat front surface portion 44 substantially parallel to the rear mating surface 37 and perpendicular to the wall 43; anti-cavitation recesses 45, 46; and a cylindrical guide bore 47b, containing a bushing or bearing 47 which is adapted to receive the driving hub 25a, and communicating with the front surface portion 44 of the pump pocket 42.

A seal 31b including a pressed-in flange 48 and a folded and rubber portion 49, is kept in tension by a contraction spring 50, and this seal 31b operates to keep oil from moving up the driving hub shaft 25a. The tapped holes 39 may be accommodated by bosses 51 projecting from the front of the novel pump body 36. An oil return passage 52 is provided in the pocket and this passage terminates in a flared-out return orifice 53, to which further reference will be made herein.

The cut-out pocket 42 is adapted to receive a gear set 54, 56 which differs from the original equipment, and which is characterized by two conjugate continuous contact gears or rotors 54, 56 wherein the inner gear has one less projection or tooth 57, 57b, than the outer gear or rotor 56, such gear or rotors being shown for example in U.S. Patent Nos. 2,229,337 and 2,871,831.

As may be seen by reference to FIGS. 3 and 6 of the drawings, a gear or rotor set 54, 56 of this type is characterized by a substantially continuous contact rotational cycle. That is, when the pinion gear or rotor 54 is rotated, a plurality of chambers 55 is continuously formed between the inside or pinion rotor 54 and the outside or ring rotor 56. Except for the small operating clearance, each of these projections 57, 57b would always contact some point on the other rotor, and therefore the chambers 55 thus formed are substantially liquid-tight without the need for a crescent member 17, as employed in the prior art and as shown, for example, in FIG. 1. In the claims appended hereto, such gear sets are referred to as "continuous contact" gears. No disadvantageous wear on the crescent 17 is therefore possible in the present invention, because this crescent dam member 17 of the prior art has been eliminated in the novel pump body.

A second principal novel feature of the present invention is the location of the pocket 42 in the pump body 36. It can be appreciated, and especially as shown in FIG. 5, that the center of this pocket 42 will be offset a certain operating distance from the center of rotation C-1 of the inner rotor 54 and driving hub 25a inasmuch as the outer rotor 56 defines the pocket 42 and the two rotors 54, 56 do not rotate about the same axis or point C-1, and the gears 54, 56 are therefore not concentrically disposed in operation. Therefore, the second center C-2 can be offset from the first center C-1 in any direction, and the entire pocket 42 will therefore be located with its center C-2 a certain distance and direction from the center of the inner rotor 54 and hub 25a. The amount of offset is determined by the size and design of the rotors 54, 56, and the amount of working clearance allowed therebetween. With the rotor sets used in the present invention, this clearance is 0.092" (ninety-two thousandths of an inch). This clearance can be up to about 0.094" (ninety-four thousandths of an inch) but larger clearances result in lower oil pressure and smaller clearances result in a binding action during gear rotation.

Contrary to what might be expected, it has been found that there is only one particularly location of the pocket 42 which allows the gears or rotors 54, 56 to "float" in equilibrium with the hub 25a, the plate 22a and the pocket 42, and this location is as follows:

As is shown in the drawings, for example, FIGS. 3 and 5, there is a center point C-1 or axis of rotation for the inner or pinion gear or rotor 54, and a second center C-2 of rotation for the outer or ring gear or rotor 56. Thus, the two centers C-1 and C-2 are offset from each other a distance of 0.092" (ninety-two thousandths of an inch) and the direction of this offset is such that when the two centers C-1 and C-2 are placed on a horizontal line L-1, a vertical line L-2 perpendicular to this line L-1 and through the first center point C-1 will be 39½° to the right of the upper locating dowel 40 as viewed from the rear, and as shown in FIGS. 3 and 5. That is, the vertical line L-2 perpendicular to the common centerline L-1 will be 39½° to the right as seen in the drawings (FIGS. 3 and 5) from the upper locating dowel 40. As referred to herein, the terms "upper" and "lower" relate to the positions of these components in the drawings and in the claims appended hereto, but not necessarily to the positions of use of the units themselves. The upper dowel 40 is shown as the one more remote from the oil return orifice 53 and the lower dowel 39 is relatively nearer the oil return orifice 53. The vertical line L-2 may thus be used as a guideline 90° from the common centerline L-1. The second center of rotation is thus disposed 0.092" to the right of the first center C-1 along a line extending outwardly from the first center C-1 at an angle of 129½° of clockwise rotation from the upper locating dowel and about the first center or bore axis C-1. Therefore, a perpendicular line L-3 through the center C-2 will be parallel to line L-2 and 0.092" away from line L-2. Although the reasons therefor are not clearly or entirely understood, the particular amount and direction of offset of the pocket 42 from the hub axis C-1 is one of the principal novel features of the present invention and this feature is critical to the proper operation of the new oil pump unit.

In operation, for example, moving the location of the center C-2 of the gear pocket 42 around the center C-1 counterclockwise about 5° to 10° will cause noisy and short-lived operation of the pump and will damage and even shear off the pump hub 25a, whereas a shift 5° or 10° clockwise will cut the plate 22a rapidly and the pump will wear out and soon fail to function.

Although the location of the pocket 42 need not be completely exact to tolerances of one-half of one degree, the best operation results when the 129½° angle is employed, and a difference of more than about two degrees (2°) and up to 5° to 10° results in performance that varies between the inefficient mode of operation and completely unsatisfactory performance, both from the standpoint of oil pressure and pump life.

The remainder of the components are located with respect thereto so as to fit the remaining standard components of the so-called Dynaflow unit as shown in FIG. 7 in an exploded relation and as employed in Buick automobiles, for example, in Buick automobiles of the type made in the years 1948–1958.

The inlet port 20a and outlet port 21a are located in the plate 20a as shown in FIG. 7 and the anti-cavitation recesses 45 and 46 are located in the normal manner inside the pump body 36. The dowels 40, 39 serve to locate the pump in respect to the cover plate 22a.

It will be further noted that the driving gear or pinion gear or rotor 54 has its driving lugs 34a separated by a distance of about 1" (one inch) whereas the ears 32a of the hub portion which operatively engage these driving lugs 34a have a width of only about ¾ of an inch, or about 0.75 inch. Thus, there is a clearance of about ¼ or 0.25 inch between the trailing edges 61, 62 of ears 32a and the leading edges 59, 60 of lugs 34a during operation. The original equipment pump of the prior art provided a corresponding clearance of about .004 to .010. Although a clearance of these proportions, namely, one-fourth of an inch in these parts of the present invention at first appears to be contrary to accepted mechanical principles, in an environment such as this, it has been found that the pump thus provided has, in actual use, an extended service life, normally substantially superior to that of the original equipment. Such replacement merely of the parts referred to in the description of the invention, namely, the rotor sets 54, 56 and the pump body 36, operate surprisingly and unexpectedly to provide a superior replacement set. The prior practice of replacing the entire pump unit (i.e. primary pump and front pump) was prohibitively expensive, and replacement of the old type gears 12, 13 only was completely unsatisfactory when the driving ears 32a and especially the portion 32ab adjacent thereto of the hub 25 were worn.

Likewise, while attempts have been made by others to design replacement pumps for use with torque converter automatic transmissions of the type described herein, such pumps have not been satisfactory because they did not embody the novel combination of elements herein described including the pocket location of the present pump. Such other attempts were totally unsatisfactory, because of their extremely short lives, sometimes only a matter of minutes, in fact, and their completely unacceptable noise level in operation.

Referring now more particularly to the gear or rotor components of the invention as shown in FIG. 6, the inner rotor 54 will be seen to consist of a somewhat sinuous outer wall portion 64 containing fourteen teeth 57 directed outwardly, a flat forward face 65, and a rear face 66, and two driving lugs 34a, the distance between such lugs being about 1″ (one inch). The inner wall of the gear 54 may be seen to have a counterbored cylindrical wall portion 62 (FIG. 7) with a diameter of about 1.75 inches. The outer diameter of the gear 54 is about 3.045 inches, and its thickness is about .562 inch. It is preferably made of SAE 1109 steel or SAE 1117 steel, although sintered metal may be used and is used successfully in the construction of the rotors 54, 56.

The outer gear 56 has a sinuous inner wall portion 68, and semicircular teeth 57b and has an outer diameter of about 3.750 inches and is made of the same material as the inner gear. The driving hub 25a is made as shown in FIG. 7, except that later models, as pointed out above, had the riveted flange portion 70a fixedly and integrally welded to the forward driving member (not shown) instead of by rivets 25b through holes 71a. The driving hub cylindrical shaft 35a has an outer diameter of about 1.748 inches, and this diameter is often reduced by wear to about 1.730 to 1.728 inches in the region 32ab of the hub 35, which region is shown in stippled in FIGS. 2 and 7. This wear, in the pumps of the prior art, allowed a prior art ring gear 12 to shift out of position and abrade the crescent 17 (FIG. 1).

The pump body 36 has a pocket diameter of about 3.754 inches and a depth of about .564 inch, and the outside diameter of the entire pump body is about 6.25 inches. All other parts are of standard specification and manufacture for Buick automobiles, and all are well known in the transmission repair art.

It will thus be noted that the advantages of the present invention include, but are not limited to, the following: (1) the provision of an inexpensive replacement pump body and gear set assembly; (2) great life expectancy; (3) elimination of the troublesome crescent member of the prior art pumps; (4) the adaptability of the present gear set and pump body to the hub is such that the hub does not require replacement; (5) simple installation procedures are possible, and no custom machining operations or highly precise fitting is required; (6) wear on the pump cover plate is substantially eliminated; and (7) maximum interchangeability with standard parts is made possible.

As used hereinafter in the claims the expression "automatic transmission of the torque converter type of the character described" refers particularly to the automatic transmission of the Buick Dynaflow torque converter type as employed in Buick automobiles for the model years 1948–1963, and equivalent automatic transmissions of the torque converter type.

When the novel pump assembly is used with automatic transmissions of 1959 year model and later, all parts are identical with those used earlier, except for the differences shown in FIGS. 8 and 9, and which changes pertain to the driving hub 25b, the inner rotor gear 54b, an inner beveled 1948–1959 construction (FIG. 3), the driving lugs 34b of located thereon. Because the driving lugs 34b are much narrower than are their counterparts 34a and 32a of the 1948–1958 construction (FIG. 3), the driving lugs 34b of the hub 25b are relatively larger in the later construction to make appropriate allowance therefor.

Other than these differences, the inner rotor gear 54b is the same as an earlier model rotor 54, and all other pertinent elements of the invention are the same. Thus, if it were desirable to adapt the pump body or gear or rotor set of the present invention from an earlier model to a later model, only a change of inner rotor gear 54 to the later model 54b would be necessary, assuming that a later model hub 25b were available.

It will thus be seen from the foregoing description, considered in conjunction with the accompanying drawings, that the present invention provides a new and improved pump body and gear set for use with the torque converter of a torque converter type automobile automatic transmission and thus has desirable advantages and characteristics and accomplishes its intended objects including those hereinbefore set forth and those which are inherent in the invention.

I claim:
1. A fluid pump for supplying fluid under pressure to an automatic transmission system of the torque converter type of the character described, said pump comprising, in combination
   (a) a pump body member adapted to receive a gear set therein,
   (b) a front cylindrical bore entering said pump body at the front thereof and having a first bore axis,
   (c) a second, gear set-receiving cylindrical bore disposed in said pump body member communicating with said first bore, and opening to the rear of said pump body member and having a second bore axis,
   (d) a pair of continuous-contact, non-concentrically arranged rotor gears disposable in said second cylindrical bore, said pair of gears comprising
      (1) an inner rotor gear including a plurality of outwardly extending tooth-like projections and two inwardly extending driving lugs, said inner rotor gear being rotatable about a first center of rotation coincident with said first bore axis, and
      (2) an outer rotor gear including a plurality of inwardly extending, tooth-like projections and a smooth outer portion, said plurality of inwardly extending projections being in number only one more than said plurality of outwardly extending projections on said inner rotor, said outer rotor being rotatable about a second center of rotation coincident with said second bore axis while in meshing engagement with said first gear,
   (e) a flat rear surface portion on said pump body member, said flat rear surface portion having disposed therein
      (1) an oil return orifice,
      (2) an upper locating dowel relatively remote from said orifice, and
      (3) a lower locating dowel relatively near said orifice,
   said pair of rotor gears being constructed and arranged such that when said gears are operated in a meshing relationship, said second center of rotation is located a distance of substantially 0.092″ from said first cen- ter of rotation, and said pump body member being constructed and arranged so that the center of said second bore is 0.092 inch from the center of said first bore and said second center is disposed on a line extending outwardly to the right from the center of said first bore in a direction which is 129½° of clockwise rotation about said first center from said upper locating dowel when said pump body member is viewed from the rear thereof.

2. A fluid pump as defined in claim 1 in which said driving lugs of said inner rotor gear are of a size providing a distance between the trailing edge of one driving lug and the leading edge of the following driving lug of about one inch, said distance being measured on a straight line between said edges.

3. A fluid pump as defined in claim 1 in which the said tooth-like projections on said outer rotor are of a truncated circular configuration, and the said projection of said inner gear are designed to meshingly engage therewith, and the said plurality of projections are 15 and 14 projections respectively, and the said second cylindrical bore has a diameter of about 3.754 inches and said inner rotor gear a diameter of about 3.045 inches.

4. A fluid pump body for use in automatic transmissions of the torque converter type of the character described, comprising a ferrous metal, generally disc-shaped member having front and rear surfaces and having communicating first and second non-concentrically disposed cylindrical bores therein adapted to receive respectively gear driving hub means and a rotor gear set of two non-concentrically disposed continuous-contact type oil pump gears, said first cylindrical bore entering said pump body at the front surface thereof and said second bore entering said pump body at the rear surface thereof, a flat rear surface extending radially outwardly from and surrounding said second cylindrical bore, said flat rear surface having a plurality of tapped, bolt-receiving holes formed therein and disposed around the periphery of said flat rear surface, said flat rear surface having a flared oil return orifice formed therein, said flared oil return orifice being disposed adjacent the bottom of said pump body, two locating dowels disposed across the said cylindrical bores of said pump body in said flat rear surface near the periphery thereof, one of said dowels being an upper locating dowel located relatively further from said orifice and the other a lower dowel located relatively nearer said orifice, the first of said bores being located substantially in the center of said disc-shaped body and being sized to accommodate a hub of a diameter of not substantially more nor substantially less than 1.75 inches and having a bore axis perpendicular to said flat rear surface, and the second of said bores being also perpendicular to said flat rear surface and having a diameter of not substantially more and not substantially less than 3.754 inches and having a depth of not substantially more nor substantially less than .564 inch, the axis of the said second cylindrical bore being located a distance of 0.092 inch from said first bore axis on a line constructed outwardly to the right of the first bore axis in a direction 129½° clockwise from said upper locating dowel around said first bore axis, when said pump body is viewed from the rear thereof.

References Cited by the Examiner

UNITED STATES PATENTS

| | | | |
|---|---|---|---|
| 2,829,602 | 4/58 | Witchger | 103—126 |
| 2,830,542 | 4/58 | Erickson et al. | 103—126 |
| 3,008,425 | 11/61 | Chambers | 103—126 |
| 3,013,848 | 12/61 | Terry | 103—126 |
| 3,027,846 | 4/62 | Schindler | 103—126 |
| 3,096,720 | 7/63 | Younger | 103—126 |
| 3,117,527 | 1/64 | Messmer | 103—126 |
| 3,130,680 | 4/64 | Johnson | 103—126 |
| 3,131,582 | 5/64 | Kelbel | 103—126 |

JOSEPH H. BRANSON, Jr., *Primary Examiner.*

WILBUR J. GOODLIN, *Examiner.*